(12) United States Patent
Heider

(10) Patent No.: US 9,235,544 B2
(45) Date of Patent: Jan. 12, 2016

(54) PORTABLE DATA CARRIER HAVING ADDITIONAL FUNCTIONALITY

(75) Inventor: Axel Heider, Munich (DE)

(73) Assignee: GIESECKE & DEVRIENT GMBH, Munich (DE)

(*) Notice: Subject to any disclaimer, the term of this patent is extended or adjusted under 35 U.S.C. 154(b) by 148 days.

(21) Appl. No.: 13/500,108

(22) PCT Filed: Oct. 4, 2010

(86) PCT No.: PCT/EP2010/064740
§ 371 (c)(1),
(2), (4) Date: Apr. 4, 2012

(87) PCT Pub. No.: WO2011/042387
PCT Pub. Date: Apr. 14, 2011

(65) Prior Publication Data
US 2012/0198155 A1   Aug. 2, 2012

(30) Foreign Application Priority Data
Oct. 5, 2009   (DE) .................. 10 2009 048 240

(51) Int. Cl.
*G06F 12/00* (2006.01)
*G06F 13/42* (2006.01)
*G06F 13/38* (2006.01)
*G06F 21/71* (2013.01)
*G06F 21/72* (2013.01)
*G06F 21/79* (2013.01)
*G06F 12/02* (2006.01)

(52) U.S. Cl.
CPC .......... *G06F 13/4234* (2013.01); *G06F 13/385* (2013.01); *G06F 21/71* (2013.01); *G06F 21/72* (2013.01); *G06F 21/79* (2013.01); *G06F 12/0246* (2013.01)

(58) Field of Classification Search
CPC .. G06F 12/0246; G06F 3/0679; G07F 7/1008
USPC ......................................................... 711/103
See application file for complete search history.

(56) References Cited

U.S. PATENT DOCUMENTS

| 5,452,431 A | 9/1995 | Bournas |
| 6,618,789 B1 * | 9/2003 | Okaue et al. .................. 711/103 |
| 6,904,493 B2 | 6/2005 | Chiao et al. |

(Continued)

FOREIGN PATENT DOCUMENTS

| CN | 1467750 A | 1/2004 |
| DE | 102006054025 A1 | 5/2008 |

(Continued)

OTHER PUBLICATIONS

International Search Report in PCT/EP2010/064740, Dec. 28, 2010.

*Primary Examiner* — Ryan Bertram
*Assistant Examiner* — Trang Ta
(74) *Attorney, Agent, or Firm* — Workman Nydegger

(57) ABSTRACT

In a method in a portable data carrier for executing an additional functionality in the data carrier, whereby the data carrier comprises a memory and whereby the additional functionality is called up by means of the one access of a conventional read command ordered from outside the data carrier to the memory of the data carrier, the additional functionality is further specified by a respective further access of at least one further conventional read command to the memory of the data carrier.

18 Claims, 2 Drawing Sheets

(56) References Cited

U.S. PATENT DOCUMENTS

| | | |
|---|---|---|
| 2004/0010656 A1 | 1/2004 | Chiao et al. |
| 2005/0086421 A1* | 4/2005 | Nassar .................. 711/103 |
| 2009/0152361 A1 | 6/2009 | Narendra et al. |
| 2010/0049988 A1 | 2/2010 | Birman et al. |
| 2010/0057980 A1 | 3/2010 | Aschauer et al. |
| 2010/0153673 A1* | 6/2010 | Shen et al. .................. 711/165 |

FOREIGN PATENT DOCUMENTS

| | | |
|---|---|---|
| EP | 1450299 B1 | 9/2010 |
| WO | 2007138021 A1 | 12/2007 |
| WO | 2008/058741 A2 | 5/2008 |
| WO | 2008058705 A2 | 5/2008 |

* cited by examiner

PORTABLE DATA CARRIER HAVING ADDITIONAL FUNCTIONALITY

A. BACKGROUND FIELD

The present invention relates to a method in a portable data carrier, for example a memory card, for executing additional functionalities on the data carrier by means of conventional read and write accesses ordered from outside the data carrier to the data carrier, and to an accordingly adapted data carrier.

B. RELATED ART

Portable data carriers which are configured substantially as storage media can support further functionalities, for example within the framework of an authentication of a user vis-à-vis the data carrier or for encrypting and decrypting data stored on the data carrier. To keep an access to the data carrier from outside the data carrier simple, which is effected by means of conventional write and read commands in the case of a simple storage medium, it is desirable to also initiate additional functionalities, which the data carrier makes available in the form of suitable internal additional commands, by means of the known write and read commands to be ordered from outside the data carrier. This makes it possible to dispense with equipping reading devices and/or data processing end devices connected to the data carrier with additional drivers in order to execute the extended functionalities of the data carrier. Furthermore, no additional middleware should be necessary, and there should not arise any new dependence on different operating systems of accessing data processing end devices.

WO 2008/058705 A2 describes in this connection a corresponding portable data carrier which is configured as a storage medium and comprises an additional module. At least one address of the memory of the data carrier is configured as a so-called additional function memory address. When this special additional function memory address is accessed in conventional fashion from outside the data carrier, a controller of the data carrier relays this access to the additional module for further processing. The additional functionality, for example a security functionality, which is initiated via the access to the additional function memory address, can be specified further by means of parameters or the like. These parameters can be written at the place of the additional function memory address for example by means of a conventional write command together with a corresponding command calling up the additional functionality. Other addresses of the memory can be accessed in conventional fashion for storing or reading out data by means of the write and read commands.

A disadvantage of this solution is that all users of the data carrier must be granted corresponding write rights for executing additional functionalities. This is not always desired because it automatically makes it possible to change the usual memory of the data carrier. Further, for executing an additional functionality in the described fashion it is required that a user knows the corresponding internal commands of the data carrier, in particular their correct syntax and the required and optional parameters.

The object of the present invention is therefore to make it possible to execute additional functionalities in simple and secure fashion in a portable data carrier otherwise configured as a storage medium.

SUMMARY OF THE INVENTION

According to the method of the invention in a portable data carrier with memory for executing an additional functionality in the data carrier, whereby the additional functionality is called up by means of the one access of a conventional read command ordered from outside the data carrier to the memory of the data carrier, the additional functionality is further specified according to the invention by a respective further access of at least one further conventional read command to the memory of the data carrier.

A portable data carrier according to the invention therefore comprises a memory and a control device for executing an additional functionality in the data carrier, and a data communication interface. The control device is adapted here to call up the additional functionality due to the one access of a conventional read command ordered from outside the data carrier to the memory. According to the invention, the control device is adapted to evaluate and process a respective further access of at least one further conventional read command to the memory of the data carrier, for specifying the additional functionality.

Hereinafter the commands received by the data carrier will also be referred to as ordered commands. The further read command that specifies the additional functionality more closely is received before the read command that triggers the additional functionality.

In this way additional functionalities of the data carrier can be executed in simple and secure fashion, whereby an executing of an additional functionality comprises both a specifying of the additional functionality and the calling up of the same. One call-up of a conventional read command from outside the data carrier causes exactly one access of the read command to the memory of the data carrier in each case, whereby such an access causes the calling-up of the additional functionality and one or several further such accesses serve to specify the additional functionality. There are required only accesses of conventional read commands—hereinafter also referred to as read command accesses or reading accesses—to the data carrier, and not any possibly unwanted accesses of a write command. Thus, account can be taken of given security requirements for the data carrier and the data processing end device by means of which the data carrier is accessed. In spite of this restricted, read-only access possibility to the data carrier, there is full flexibility in the use of the additional functionality, because it is also possible to specify the additional functionality by means of read command accesses. Any user, even one with restricted rights with regard to accessing the data carrier, can utilize the additional functionality in a fashion specifiable by him, whereby the remaining contents of the data carrier are protected from unauthorized change.

A specifying of the additional functionality can, according to a first preferred embodiment, comprise a partial or complete coding of the additional functionality. Only by means of read command accesses to the memory of the data carrier, whereby each of these accesses is caused by exactly one conventional read command ordered from outside the data carrier, the additional functionality can thus for example be put together from predetermined subroutines or else initially coded. That is, the data carrier can on principle be freely programmed via pure read command accesses within the framework of what a control unit of the data carrier makes available and supports.

According to a second preferred embodiment, the additional functionality is specified by input data and parameter data, which finally establish the additional functionality and make it flexibly usable, being defined by means of read command accesses to the memory of the data carrier, and thus transferred to the additional functionality or a data-carrier control device executing the additional functionality. Again, exactly one conventional read command ordered from outside the data carrier is required here for each individual read command access. Predetermined or partly or completely newly coded additional functionalities of the data carrier can in this way be employed variably and adjusted to different applications without any write access to the memory of the data carrier being necessary.

According to a preferred embodiment of the method of the invention, an additional functionality is executed by means of the following substeps: In a first step, predetermined memory addresses of the memory of the data carrier are linked with information units of the data carrier. Thereafter, for calling up and specifying the additional functionality, different ones of the predetermined memory addresses are accessed in reading fashion, i.e. by means of conventional read commands. Those information units that have been linked with the predetermined memory addresses that have been accessed by means of the read commands are then processed by a control device of the data carrier for executing the additional functionality in the data carrier. One portion of the processed information units here represents input data or parameter data of the additional functionality, for example, or one portion of the processed information units is employed for coding the additional functionality by means of a plurality of the information units. The control device of the data carrier recognizes and interprets a respective access of a conventional read command to the predetermined memory address of the memory as an input of that information unit that is linked with the corresponding predetermined memory address.

The information units of the data carrier which are linked with the predetermined memory addresses of the memory can be configured in different ways. An information unit can for example itself make available an additional functionality executable by the control device on the data carrier. According to a preferred embodiment, a range of additional functionalities executable in the data carrier is made available selectably in this way. But also an input data set or a parameter data set for an additional functionality can be made available by means of an information unit, whereby again a predetermined amount of input data and parameter data is preferably kept available selectably in this way for each additional functionality. According to a generalized embodiment, an information unit makes available only one character or character string over a predetermined alphabet. Characters or character strings of this alphabet serve here for coding an additional functionality or for defining input data or parameter data for a predetermined additional functionality or one yet to be coded. By means of a sequence of read command accesses to memory addresses which are linked with information units in the form of such characters or character strings, arbitrary information can in principle be coded and transferred to the control device of the data carrier for processing, for example for interpreting or compiling.

Preferably, a predetermined memory address of the memory of the data carrier is linked with an information unit of the data carrier by the memory address comprising a reference to the information unit or storing the information unit itself.

The control device of the data carrier normally processes the information units for executing an additional functionality such that an additional functionality coded by means of a plurality of information units or one referenced by means of an information unit is executed, optionally employing input data or parameter data defined by means of a plurality of information units or referenced by means of an information unit. By means of suitable read accesses to predetermined memory addresses of the memory, a user can thus completely specify the additional functionality, i.e., on the one hand, select or even code the additional functionality to be executed itself, and define necessary or optional input data as well as parameters which are to be transferred to the additional functionality, and thus transfer them to the control device of the data carrier, which is adapted to interpret these read accesses correspondingly and to execute the additional functionality accordingly.

According to a preferred embodiment of the method of the invention, a virtual file system is made available in the memory of the data carrier, whereby the predetermined memory addresses are uniquely associated with directories and files of the file system. In this way, the predetermined memory addresses can be presented to a user in a way known to him. A content-based, hierarchical organization of different information units is also supported by a file system. A reading access to a directory or a file of the file system is then interpreted as a reading access to the predetermined memory address that is associated with the corresponding directory or the corresponding file. An association of directories and files with predetermined memory addresses can be effected by means of known techniques, for example a so-called file allocation table (FAT) or the like.

The file system here can comprise different tagged directories. An additional functionality directory for example comprises a file for each additional functionality made available in the data carrier. That is, such a file is associated with a predetermined memory address which is in turn linked with the corresponding additional functionality executable by the control device. Analogously, each file of an input data and parameter data directory of the file system is associated with such a predetermined memory address which is linked with a corresponding input data set or parameter data set. It is possible to provide different subdirectories for different input data sets, for example in dependence on the size of the respective input data sets. The same of course applies to parameter data sets. There, a subdirectory can for example be created for standard parameters, and further subdirectories for those parameter data that are required only in special cases. In a very general form, a so-called alphabet directory can be made available. A file in this directory corresponds to a character or character string of an alphabet and is associated accordingly with a predetermined memory address of the memory which is linked with the information unit in the form of the character or character string. Reading accesses to such files thus make possible a coding of freely selectable information, as described in detail hereinabove.

According to a further preferred embodiment, the control device of the data carrier is adapted to generate data dynamically upon processing of the information units, in dependence on the processed information units. For example, a read access to a predetermined memory address which is linked with an information unit in the form of an input data set can make the control device generate the corresponding input data set dynamically. An additional functionality or subroutines of the additional functionality can also be generated dynamically in executable form only when the predetermined memory address linked with the additional functionality is accessed. In this way it is in particular possible to save memory resources of the data carrier. The control unit can further dynamically generate special display data, for example in the form of HTML data, which facilitate, or only make possible, an access to the data carrier by means of standardized tools, for example a browser.

In principle, arbitrary additional functionalities can be made available in the data carrier or coded in the way described hereinabove. Preferably, there are made available additional functionalities that support an authentication, for example a logging in of a user to the data carrier. An encrypting and decrypting of data on the data carrier can also be made available by means of suitable additional functionalities. The two classes of additional functionalities can be grouped under the term "security functionalities". Finally, there can be provided network functionalities which support a data communication between the data carrier and a further instance over a data communication network, for example over the Internet.

According to the invention, an access to the memory of the data carrier is requested by a read command. However, it is in fact neither necessary for an access to the memory to be effected, nor for the address to physically exist, because it suffices to evaluate the requested access to determine the additional functionality (more closely).

A system according to the invention comprises a data carrier according to the invention and a data processing end device with a reading device for accessing the data carrier via the data communication interface of the data carrier by means of a conventional read command. The data processing end device is thus adapted to execute the method of the invention according to one of the described variants by suitable read accesses from outside the data carrier to predetermined memory addresses of the data carrier. The data carrier can be configured in diverse ways, for example in the form of a memory card, a chip card, a USB token or the like. The data processing end device can be for example a personal computer (PC), a notebook, a mobile radio end device or the like. The data communication between the data carrier and the data processing end device is normally effected with contact, but a contactless data communication is also possible alternatively or additionally.

DESCRIPTION OF THE DRAWINGS

The present invention will hereinafter be described by way of example with reference to the attached drawings. Therein are shown.

DETAILED DESCRIPTION OF PREFERRED EMBODIMENTS OF THE INVENTION

Figure 1:
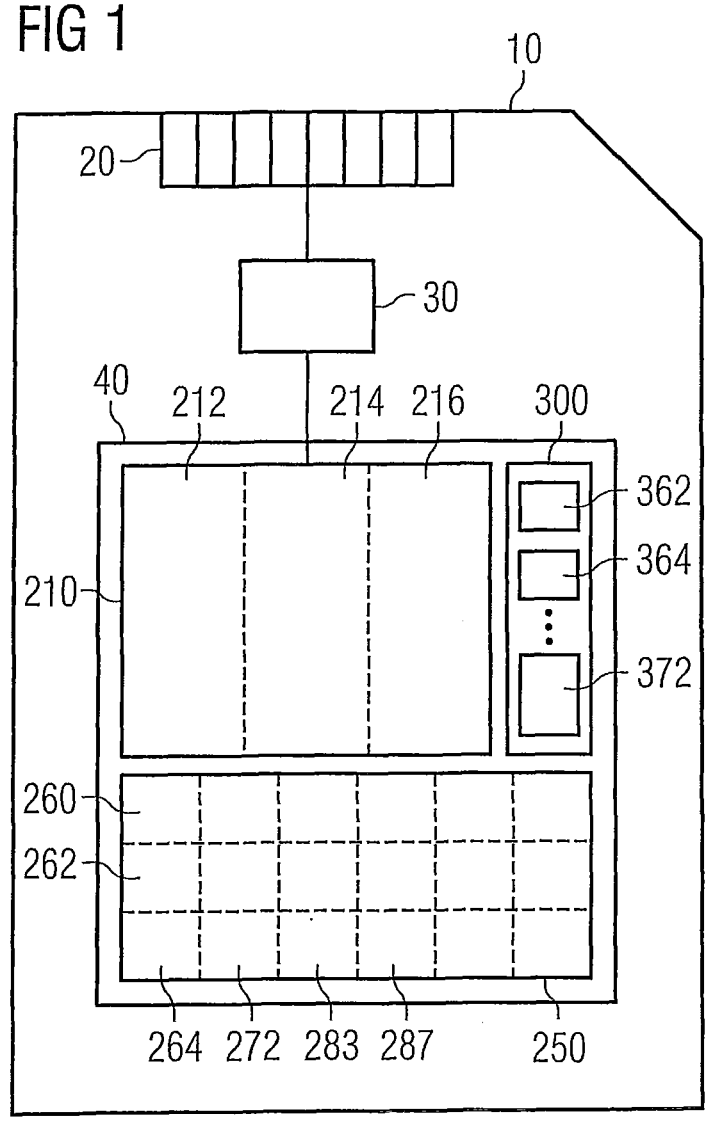
FIG. 1 a preferred embodiment of a portable data carrier according to the invention, and FIG. 2 a virtual file system in a memory of the data carrier from FIG. 1.

With reference to FIG. 1, there is shown a portable data carrier 10 in the form of a memory card. It comprises a data communication interface 20 for contact-type data communication with a suitable reading device (not shown), a control device 30 and a memory 40. Alternatively or additionally to the data communication interface 20 there can also be provided an antenna coil (not shown) or the like for contactless data communication.

The control device 30 comprises a controller of the data carrier 10 and the necessary software means, for example an operating system, for controlling the data carrier 10. The function of the control device 30 will be described more precisely hereinafter.

The memory 40, for example a non-volatile, rewritable flash memory, is divided into different areas. The area 210 serves a user of the data carrier for storing data, for example texts, images, music data and the like, which can be stored separately in terms of content in the subareas 212, 214, 216. In the area 300 information units of the data carrier 10 are stored, for example additional functionalities 362, 364 executable by the control device 30, and parameter data or input data 372 required for executing these additional functionalities 362, 364. Alternatively or additionally to the memory 40, the data carrier 10 can also comprise one or several further memories (not shown) separate from the memory 40, also of a different kind. At least a portion of the information units, for example the additional functionalities 362, 364, can then be stored for example in such an additional memory, which can also be configured as a ROM memory. A third area 250 of the memory 40 comprises a set of predetermined memory addresses 260, 262, 264, 283, 287 of the memory 40, whose function and importance will be described in detail hereinafter.

The data carrier 10 is adapted to be addressed via the data communication interface 20 by means of conventional read and write command from outside the data carrier, by means of which a user of the data carrier 10 can read data stored in the memory area 210 of the memory 40 or can store data there by means of a write command. For this purpose, the data carrier 10 is connected via a suitable reading apparatus, for example a card reader, to a data processing end device, such as e.g. a PC, a notebook or a mobile radio end device. From the data processing end device, a user can then access the different memory areas 210, 250 of the memory 40 by means of the conventional write and read commands. To this extent, the data carrier 10 does not differ from a conventional memory card.

In contrast to a conventional memory card, the data carrier 10 comprises additional functionalities 362, 364 by means of which for example an authentication of a server on the Internet vis-a-vis the data carrier 10 becomes possible. Further, the data carrier 10 makes available cryptographic additional functionalities 364 which make possible an encrypting and decrypting of data on the data carrier 10. These additional functionalities 362, 364 can be executed, i.e. in particular specified and called up, by means of conventional read command accesses to predetermined memory addresses 260, 262, 264, 272, 283, 287 of the area 250 of the memory 40.

Each of the predetermined memory addresses 260, 262, 264, 272, 283, 287 in the area 250 of the memory 40 is linked with an information unit 362, 364, 372 of the data carrier 10. Information units, as mentioned hereinabove, can be for example corresponding additional functionalities 362, 364 in the form of executable program code, which are executable on the data carrier 10 by the control device 30, as well as relevant input or parameter data 372. Information units can in general fashion also be only characters or character strings, however, which are employed to code arbitrary information, for example to code a further additional functionality or to define a special parameter data set or input data set not already stored as an information unit.

The control device 30 is adapted to evaluate every access to one of the predetermined memory addresses 260, 262, 264, 272, 283, 287 and to process it as an input of the information units 362, 364, 372 linked with the corresponding memory addresses. In the simplest case, the control device 30 interprets for example a reading access to the predetermined memory address 262, which is linked with the information unit 362 in the form of a command for executing an authentication functionality, as a call-up of the corresponding application 362, and starts the latter (as to be described more closely hereinafter). Further reading accesses, for example to the predetermined memory address 372, make it possible for a user to define parameter data 372, which are linked as an information unit with the predetermined memory address 272, for executing the command 362. Data not already pre-configured as information units in the described fashion can be conveyed to the control device 30 by reading access to those predetermined memory addresses 283, 287 that are linked with information units that code individual characters or character strings of a predetermined alphabet. In dependence on the capabilities of the control device 30 it is in this way possible to program the data carrier 10 almost freely, for example when the control device 30 comprises a suitable compiler or interpreter. For this purpose, accordingly required read command accesses can be effected in automated fashion, for example under the control of the data processing end device connected to the data carrier 10 via the data communication interface 20.

A linking of the predetermined memory addresses 260, 262, 264, 272, 283, 287 with the corresponding information units 362, 364, 372 is effected for example by the predetermined memory addresses 260, 262, 264, 272, 283, 287 comprising references to the information units 362, 364, 372, or else storing them themselves, for instance when the information units only involve small amounts of data, such as for example individual characters or short character strings.

Figure 2:
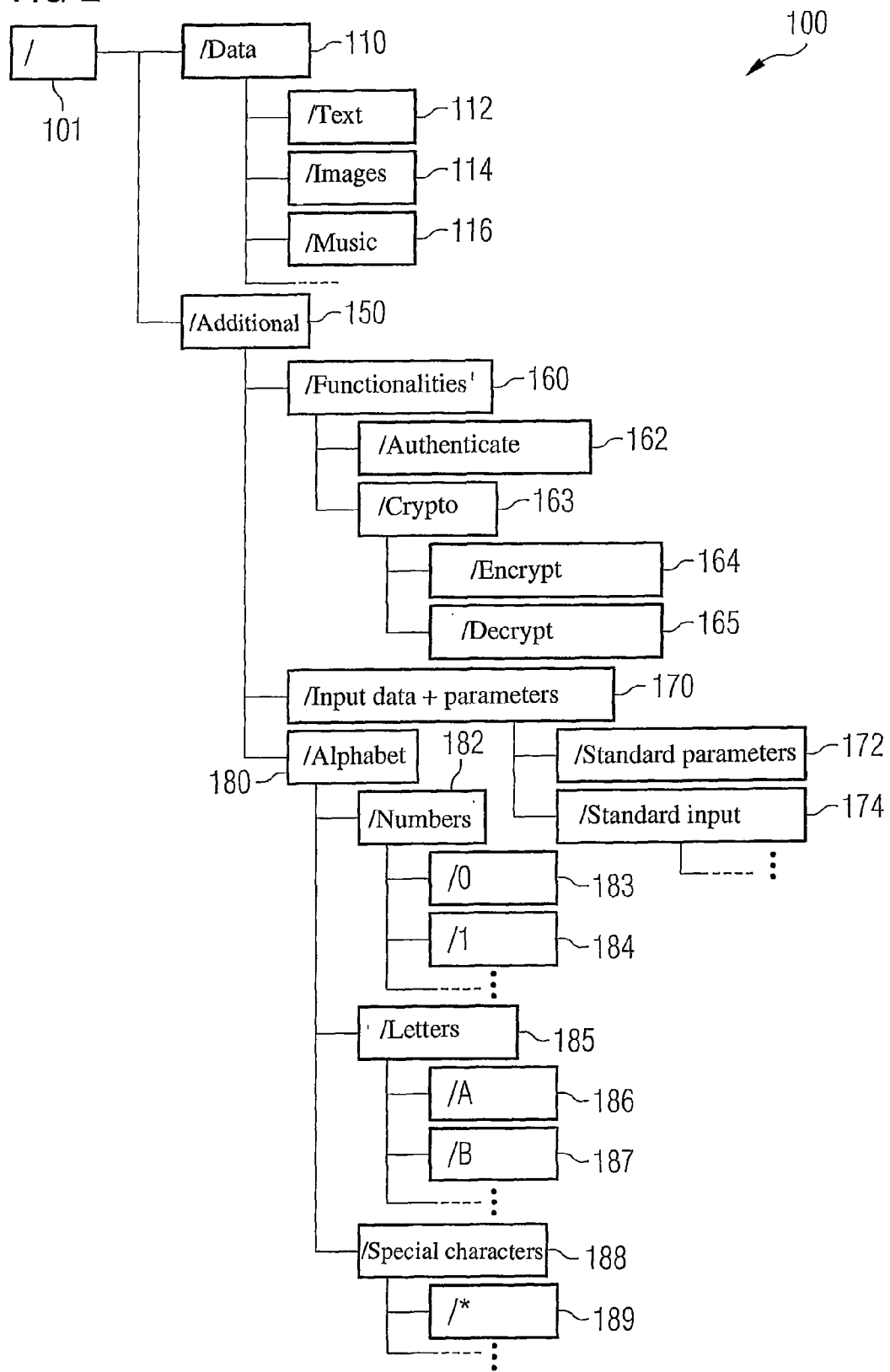

To make it easier for a user to access the predetermined memory addresses 250, and to organize them thematically, there is made available in the memory 40 a virtual file system 100, which is represented schematically in FIG. 2. Below a root directory 101, two subdirectories 110 and 150 are created on the first level. In the subdirectory 110 ("Data"), which is associated with the area 210 of the memory 40, there are further subdirectories which the user of the data carrier can normally create and erase at will, and which further structure the area 210 for storing personal data, by for example subdirectories being created for storing texts, images and music data 112, 114, 116. In the subdirectory 150 ("Additional") there are directories and files that are associated with the predetermined memory addresses 250 of the memory 40. This portion of the file system 100 is managed exclusively by the control device 30 and can normally not be changed by a user of the data carrier 10. It is possible, however, that the control device 30 dynamically adjusts the structure of the subdirectory 150, for example when the user stores new data in the area 210 which can then be considered input data of an encryption functionality. The memory area 300 cannot be seen in the file system 100, because there is no occasion for a user of the data carrier 10 to access a data set stored in this memory area.

When a directory or a file in the subdirectory 150 of the file system 100 is now accessed in reading fashion (a writing access being excluded on principle and prevented by the control device 30), the control device 30 interprets this access as an access to that predetermined memory address with which the corresponding directory or corresponding file is associated, for example by means of a file allocation table (FAT). An access to the file 162 ("Authenticate") in the directory 160 ("Functionalities") is interpreted by the control device 30 as a reading access to the predetermined memory address 262 associated with this file 162, which address is in turn linked with the information unit 362. That is, the control device 30 starts the authentication application 362. Analogously, there can be started further functionalities, for example cryptofunctionalities, which are activatable in the file system 100 via the subdirectory 163 ("Crypto") as files 164 ("Encrypt"), 165 ("Decrypt").

A transfer of parameter or input data to the control device 30 can be effected by means of reading access to corresponding files (not shown) in the directories 170, 172, 174. Alternatively or additionally, it can be provided that subdirectories of the functionality directory 160 comprise, besides the files for the additional functionalities, also files for the parameter data sets or input data sets for the additional functionalities, i.e. the parameters and input data are thus arranged respectively with the corresponding additional functionalities which they go with.

In the subdirectory 180 (Alphabet) there are set up three further subdirectories 182 ("Numbers"), 185 ("Letters") and 188 ("Special characters"), which in turn respectively comprise files 183, 184 corresponding to individual numbers "0", "1", etc., further those files 186, 187 corresponding to individual letters "A", "B", etc., and those files 189 coding special characters, for example, "*", when they are accessed in reading fashion. Alternatively, the subdirectory 180 can also be created such that corresponding characters or character strings are coded uniformly, e.g. in binary fashion, and different subdirectories are created that respectively contain all the files for coding character strings of predetermined length. A first subdirectory could contain all the files serving to code a character of the alphabet, a second subdirectory all the files for two-element character strings, a third subdirectory all the files for four-element character strings, etc. In this way there can be conveyed to the control device 30, with a read command access, arbitrary information which is codable by a predetermined number of characters over the alphabet. Longer character strings can be assembled from a small number of shorter ones in the same fashion. Via suitable read accesses to files in such a subdirectory 180, arbitrary information can be conveyed to the control device 30 of the data carrier 10.

The file system can be in particular a virtual file system. Thus, less memory space is consumed for the coding of the call-ups of the additional functionality. The read command can thus access (virtual) memory addresses not present in the memory of the data carrier. For example, an eight-element character string is thus codable with a single read command, even without an accordingly large memory.

Hereinafter, the executing of a special additional functionality 362 of the data carrier 10 by means of read accesses ordered from outside the data carrier to predetermined memory addresses 262 of the memory 40 of the data carrier 10 will be described by way of example. The additional functionality 362 relates to the authenticating of a server on the Internet vis-à-vis the data carrier 10, whereby this authenticating is carried out in the form of a challenge-response method. For this purpose, the data carrier 10 is connected to a data processing end device via a suitable reading device. On the data processing end device there is executed a browser application which is authorized to access the file system 100 of the data carrier 10 in reading fashion.

In a first step, the browser application accesses in reading fashion the file 162 in the subdirectory 160 of the file system 100. The control device 30 of the data carrier 10 rates this access as an access to the predetermined memory address 262 associated with this file 162, which address is in turn linked with the information unit 362 in the form of the authentication functionality 362.

The authentication functionality 362 is started, and dynamically generates an HTML file by which the browser application on the data processing end device is caused to set up a data communication connection with the server and to send a so-called "challenge", for example in the form of a random number, to the server.

The server receives the message of the data carrier 10 via the browser, recognizes it as the first step of an authentication method and generates an answer, a "response", which is derived from the received challenge in predetermined, normally secret, fashion. Subsequently, the server sends this response, in the form of one or several HTML files, via the browser to the data carrier 10. The HTML file(s) comprise(s)

the response or portions thereof such that the browser, upon reception of the HTML file(s), is respectively caused to access in reading fashion a file, predetermined by the response file, in the file system 100 of the data carrier 10. Assuming the response of the server to the received challenge is "ABA*01", the server could convey this response to the data carrier 10 by sending six HTML files to the browser, which successively cause it to access the files 186, 187, 186, 189, 183, 184 ("A", "B", "A", "*", "0", "1") in the subdirectories 185, 182, 188 (/Additional/Alphabet/{Letters, Special characters, Numbers}) by means of a read command. The control device 30 of the data carrier 10 evaluates these read accesses, recognizes them as the response, sent by the server, to the challenge, verifies their correctness, i.e. authenticates the server, and again dynamically generates, in dependence on the result of the check, an HTML file which causes the browser to send a message coded in the HTML file to the server in order to report whether or not the authentication was successful.

With the described method, the server can authenticate itself vis-à-vis the data carrier 10 without this requiring a write access to the memory 40 of the data carrier 10. Further, one can dispense with installing on the data processing end device new driver software which directly supports the authentication functionality of the data carrier 10. It suffices that the browser, a standard application normally installed on every data processing end device, can access the file system 100 of the data carrier 10 in reading fashion. Any common operating system installed on the data processing end device supports such an access, even for users with restricted authorization. Only the predetermined memory addresses in memory area 250 of the data carrier 10 which are accessed during the executing of the authentication method by the browser must have the corresponding read authorization. This authorization is given in suitable fashion, however, by the control device 30 of the data carrier 10.

The invention claimed is:

1. A method in a portable data carrier having a memory which can be accessed in reading fashion by means of conventional read commands from outside the data carrier, the method comprising:
   receiving a conventional read command from outside the data carrier directed to the memory of the data carrier;
   receiving at least one further conventional read command directed to the memory of the data carrier; and
   calling up an additional functionality in the data carrier in response to the received conventional read command;
   wherein first predetermined memory addresses of the memory of the data carrier are linked with additional functionalities of the data carrier and second predetermined memory addresses of the memory of the data carrier are linked with information units;
   wherein, for selecting the additional functionality to be called, one of the conventional read command or the further conventional read command is directed to a memory address of the first predetermined memory addresses, and
   wherein, for specifying input data or parameter data for the additional functionality to be called, at least one of the conventional read command or further conventional read command is directed to a memory address of the second predetermined memory addresses.

2. The method according to claim 1, wherein a first memory area of the data carrier is accessible for an external device in reading fashion by conventional read commands, and the additional functionalities of the data carrier are accessible by respective conventional read commands of an external device directed to a second memory area of the data carrier, the second memory area comprising the first predetermined memory addresses.

3. The method according to claim 1, wherein, upon receiving the at least one further conventional read command specifying an additional functionality, the additional functionality is coded by an access of the further conventional read command to the memory of the data carrier.

4. The method according to claim 1, wherein upon receiving at least one further conventional read command specifying an additional functionality, input data and parameter data of the additional functionality are defined by the further conventional read command.

5. The method according to claim 1, wherein the additional functionality is executed by the following substeps:
   linking one of the second predetermined memory addresses of the memory with the information units of the data carrier;
   accessing one of the first predetermined memory addresses by different accesses by respective conventional read commands for calling up and specifying the additional functionality;
   processing the information units which have been linked with the second predetermined memory addresses which have been accessed by means of the conventional read commands, by a control device of the data carrier.

6. The method according to claim 5, wherein, as one of the information units there are made available characters or character strings of a predetermined alphabet for coding the additional functionality or for defining input data or parameter data by means of a sequence of such characters or character strings.

7. The method according to claim 6, wherein one of the second predetermined memory addresses is linked with one of the information units by comprising a reference to the one of the information units.

8. The method according to claim 5, including linking the one of the second predetermined memory addresses with one of the information units by storing the one of the information units.

9. The method according to claim 5, wherein the control device generates data dynamically upon processing the information units in dependence on the information units.

10. The method according to claim 5, wherein a virtual file system is made available in the memory, so that the first predetermined memory addresses are associated uniquely with directories and files of the virtual file system.

11. The method according to claim 1, wherein an additional functionality directory is made available in a file directory, so that a file in the additional functionality directory is associated with said one of the first predetermined memory addresses which is linked with the additional functionality executable by the control device.

12. The method according to claim 1, wherein an input data and parameter data directory is made available in a file directory, so that a file in the input data and parameter data directory is associated with said one of the first predetermined memory addresses which is linked with input data or parameter data.

13. The method according to claim 1, wherein an alphabet directory is made available in a file directory, so that a file in the alphabet directory is associated with said one of the first predetermined memory addresses which is linked with a character or a character string of the predetermined alphabet.

14. A portable data carrier comprising:

a memory;

a control device configured to execute an additional functionality in the data carrier; and a data communication interface, wherein the control device is arranged to call up the additional functionality by first accessing a conventional read command ordered from outside the data carrier to the memory, and the control device is arranged to evaluate and process a respective further access of at least one further conventional read command to the memory of the data carrier, to thereby specify the additional functionality, wherein the data carrier is configured to execute the method recited in claim 1.

15. A system, comprising a portable data carrier according and a data processing end device, wherein the portable data carrier includes a memory, a control device configured to execute an additional functionality in the data carrier, and a data communication interface, the control device is arranged to call up the additional functionality by first accessing a conventional read command ordered from outside the data carrier to the memory, the control device is arranged to evaluate and process a respective further access of at least one further conventional read command to the memory of the data carrier, to thereby specify the additional functionality, the data processing end device includes a reading device configured to access the data carrier via the data communication interface by a conventional read command, and wherein the system is configured to execute the method recited in claim 1.

16. A method in a portable data carrier, the method comprising:

providing access to a first memory area of the data carrier, the first memory area being accessible for an external device in reading fashion by conventional read commands; and providing additional functionalities executable by the data carrier, wherein in response to a received conventional read command from an external device directed to a memory address of a second memory area of the data carrier, an additional functionality is called up in the data carrier, wherein first predetermined memory addresses of the memory of the data carrier are linked with additional functionalities of the data carrier and second predetermined memory addresses of the memory of the data carrier are linked with information units, wherein the additional functionality is selected to be called by at least one further received conventional read command directed to a memory address of the first predetermined memory addresses of the second memory area of the data carrier, wherein at least based on the memory address of the received at least one further conventional read command the additional functionality is selected from the additional functionalities executable by the data carrier, and wherein, for specifying input data or parameter data for the additional functionality to be called, the conventional read command is directed to a memory address of the second predetermined memory addresses.

17. The method according to claim 16, wherein a first memory area of the data carrier is accessible for an external device in reading fashion by conventional read commands, and the additional functionalities of the data carrier are accessible by respective conventional read commands of an external device directed to the second memory area of the data carrier, the second memory area comprising the first predetermined memory addresses.

18. A portable data carrier comprising:

a memory;

a control device configured to execute an additional functionality in the data carrier; and a data communication interface, wherein the control device is arranged to call up the additional functionality by first accessing a conventional read command ordered from outside the data carrier to the memory, and the control device is arranged to evaluate and process a respective further access of at least one further conventional read command to the memory of the data carrier, to thereby specify the additional functionality, wherein the data carrier is configured to execute the method recited in claim 16.

* * * * *